United States Patent
Elbers et al.

(10) Patent No.: US 7,197,210 B2
(45) Date of Patent: Mar. 27, 2007

(54) METHOD AND DEVICE FOR DETERMINING AND COMPENSATING FOR THE TILTING OF THE SPECTRUM IN AN OPTICAL FIBER OF A DATA TRANSMISSION PATH

(75) Inventors: Jörg-Peter Elbers, München (DE); Andreas Färbert, München (DE); Christoph Glingener, Feldkirchen-Westerham (DE); Lutz Rapp, Deisenhofen (DE); Christian Scheerer, Ottawa (CA)

(73) Assignee: Siemens Aktiengesellschaft, Munich (DE)

( * ) Notice: Subject to any disclaimer, the term of this patent is extended or adjusted under 35 U.S.C. 154(b) by 6 days.

(21) Appl. No.: 10/362,272

(22) PCT Filed: Aug. 10, 2001

(86) PCT No.: PCT/DE01/03073

§ 371 (c)(1),
(2), (4) Date: Sep. 29, 2003

(87) PCT Pub. No.: WO02/17514

PCT Pub. Date: Feb. 28, 2002

(65) Prior Publication Data

US 2004/0120639 A1  Jun. 24, 2004

(30) Foreign Application Priority Data

Aug. 21, 2000 (DE) ................ 100 40 791

(51) Int. Cl.
G02B 6/26 (2006.01)
G02B 6/42 (2006.01)
H04B 10/08 (2006.01)
H04B 17/00 (2006.01)

(52) U.S. Cl. .............. 385/39; 398/9; 398/25; 398/37; 356/301; 356/454; 356/477; 385/12; 385/14

(58) Field of Classification Search ........ 359/333–334, 359/337, 337.1, 341.3, 341.31; 356/301, 356/454, 477; 385/5, 12, 14, 39; 398/25
See application file for complete search history.

(56) References Cited

U.S. PATENT DOCUMENTS

| 5,818,629 A * | 10/1998 | Kinoshita ............ 359/337.11 |
| 5,969,840 A * | 10/1999 | Roberts .................. 398/32 |
| 6,049,413 A * | 4/2000  | Taylor et al. ............ 359/337 |
| 6,175,671 B1 * | 1/2001 | Roberts ................. 385/14 |
| 6,411,417 B1 * | 6/2002 | Roberts et al. ........... 398/177 |

FOREIGN PATENT DOCUMENTS

| EP | 0 933 894 | 8/1999 |
| FR | 2 774 482 | 8/1999 |

* cited by examiner

Primary Examiner—Frank G. Font
Assistant Examiner—Ryan Lepisto
(74) Attorney, Agent, or Firm—Bell, Boyd & Lloyd LLP

(57) ABSTRACT

A method is provided for determining and setting the tilting of the spectrum of light signals in an optical fiber of an optical data transmission path having at least one part for varying the tilting of the spectrum, wherein the light signals are amplified by at least one optical amplifier and a portion of the amplified light signals is extracted, the extracted light signals are then partially guided through an influencing element with a known frequency-dependent intensity influence, the influencing element being an amplifier, a waveguide structure or a fiber with an amplifying action, the total intensity of the extracted light signals is then measured upstream and downstream of the influencing element prior to the extracted light signals being guided through the influencing element, and the control criterion is determined, based on the known frequency-dependent intensity influence of the influencing element and the measured total intensity, for setting the tilting via which the part for varying the tilting is controlled.

8 Claims, 3 Drawing Sheets

METHOD AND DEVICE FOR DETERMINING AND COMPENSATING FOR THE TILTING OF THE SPECTRUM IN AN OPTICAL FIBER OF A DATA TRANSMISSION PATH

BACKGROUND OF THE INVENTION

It is known that power is transferred from higher to lower frequencies (from lower to higher wavelengths) and thus between data transmission channels in optical fibers by stimulated Raman scattering (SRS). Thus, the original frequency spectrum of the light signal is "tilted". This reduces the received power of the channels with short wavelengths; thus, increasing their bit error rate. It is also known to measure the tilting of the spectrum of light signals that are guided through optical fibers, particularly of optical data transmission paths, and to counteract this tilting by appropriate filtering or amplification.

In order to determine this tilting, use is made in the prior art of a complicated spectrally resolving measuring technique that cannot be widely applied because of the expensive and bulky measurement technology.

Furthermore, there is known from U.S. Pat. No. 5,818,629 a method and an arrangement for determining a mean wavelength ("momental wavelength") of the transmitted light signals, and a control, dependent thereon, of an optical amplifier for compensating for the tilting of the spectrum of the transmitted light signals, in the case of which the "momental wavelength" of the injected light signals is determined in a "monitoring device" (see FIG. 1). The mean wavelength ("momental wavelength") is used to determine the tilting of the spectrum of the injected light signals within the optical transmission system, and to control the amplification of the optical amplifier so as to virtually compensate for the determined tilting of the spectrum. Such a method requires the technically complicated determination of the mean wavelength and the evaluation thereof.

It is, therefore, an object of the present invention to develop a method that can determine the tilting of the spectrum in an optical fiber in a simple and quick way without a spectrally resolving measuring technique.

SUMMARY OF THE INVENTION

In consideration of the above, the inventors have made the following findings:

As a consequence of the stimulated Raman scattering (SRS), power is transferred from channels with shorter wavelengths to channels with longer wavelengths. Some of the channels thus experience an additional attenuation, while the others experience through this nonlinear effect an amplification counteracting the fiber attenuation. This amplification or additional attenuation is a function of time. However, this aspect can be neglected in the case of strongly differing group delays between the interacting channels, which is frequently the case when use is made of SSMF (Standard Single Mode Fiber). Nevertheless, the result is precisely different mean powers for the individual channels as from the wavelength dependence of the gain in EDFA (Erbium Doped Fiber Amplifiers). This effect is termed "tilting" of the spectrum. It is possible, in principle, for the gain of an EDFA to be set specifically such that this effect is countered. However, compensating for any tilting in a data transmission path requires a simple method to be found for determining the tilting.

It is also possible, in principle, to determine a linear tilting, that is to say a first-order tilting, via the information from two total intensities in the spectrum respectively after the passage through at least one filter with a known frequency-dependent transmission characteristic, or at least one amplifier with a known frequency-dependent influencing characteristic, designated in general as influencing element below. Tiltings of higher order, that is to say nonlinear tiltings, can be approximated correspondingly by an appropriately high number of measurements of total intensities after the passage through other known frequency-dependent influencing elements in each case.

In order to determine the spectral tilting of a signal, it is sufficient, in principle, to extract light at a site and to determine the total intensity after the passage of two influencing elements; for example, filters or frequency-dependent amplifiers. One of these filters also can be reduced to an all-pass filter without phase response, such that it can just as well be removed. One influencing element and two measuring sites then suffice here for the total intensity, in order to determine the spectral tilting of the signal. However, if the total intensity of a signal is already known from other information before the passage through an influencing element, a single influencing element and a single measuring site of the total intensity downstream of this influencing element also suffice.

Signal tiltings in a signal path and tilting caused by the EDFA are fundamentally similar if a flat input spectrum is presupposed. However, in a transmission system, the spectrum at the transmitter end is deliberately predistorted such that the signal tilting downstream and upstream of the EDFA must be determined in order to determine the tilting by the EDFA, since otherwise the information about the input signal is not to hand.

In accordance with these inventive ideas outlined above, the inventors propose to improve the known method for determining the tilting of the spectrum of light signals in an optical fiber of an optical data transmission path by virtue of the fact that the optical data transmission path has the tilting of the spectrum, and the light signals are amplified by at least one optical amplifier, and a portion of the amplified light signals is extracted. The extracted light signals are partially guided through an influencing element with a known frequency-dependent intensity influence. Furthermore, the total intensity of the extracted light signals is measured upstream and downstream of the influencing element, and the total intensity of the light signals is measured before the amplification. Use is made in this case as influencing element (11) of an amplifier or a waveguide structure or fiber with an amplifying action. There is determined on the basis of the known influence of the influencing element (11) and the measured total intensities a control criterion for setting the tilting via which the tilting capability is controlled.

In a particular embodiment of the method, it is provided that use is made, as influencing element, of a settable optical filter and/or a frequency-dependent amplifier, it preferably being possible for this to be an EDFA (Erbium-doped Fiber Amplifier). It is also possible to make use as amplifier of other waveguide structures doped with rare earths. A Mach-Zehnder with adjustable time delay in one branch or settable intensity division onto the two branches is an example for a settable optical filter.

In accordance with the teachings of the present invention, the measuring method represented above also can be used for a method for setting or compensating for the tilting of the spectrum of light signals in an optical fiber of an optical data transmission path. This tilting can be varied or compensated for by virtue of the fact that one or more settable filters or attenuators and/or the frequency dependence of the amplification of one or more optical amplifiers, such as EDFA or other waveguide structures doped with rare earths, are set in such a way that they counteract the tilting produced on the transmission path.

It can be provided here according to the present invention that the part for varying the spectrum is a frequency dependent optical amplifier, preferably a waveguide structure doped with rare earths, a fiber or an EDFA, it being possible for the frequency dependence of the amplification of the waveguide structure or fiber to be set by varying the pump power in such a way that is opposes the original tilting.

Additional features and advantages of the present invention are described in, and will be apparent from, the following Detailed Description of the Invention and the Figures.

DETAILED DESCRIPTION OF THE INVENTION

Figure 1A:
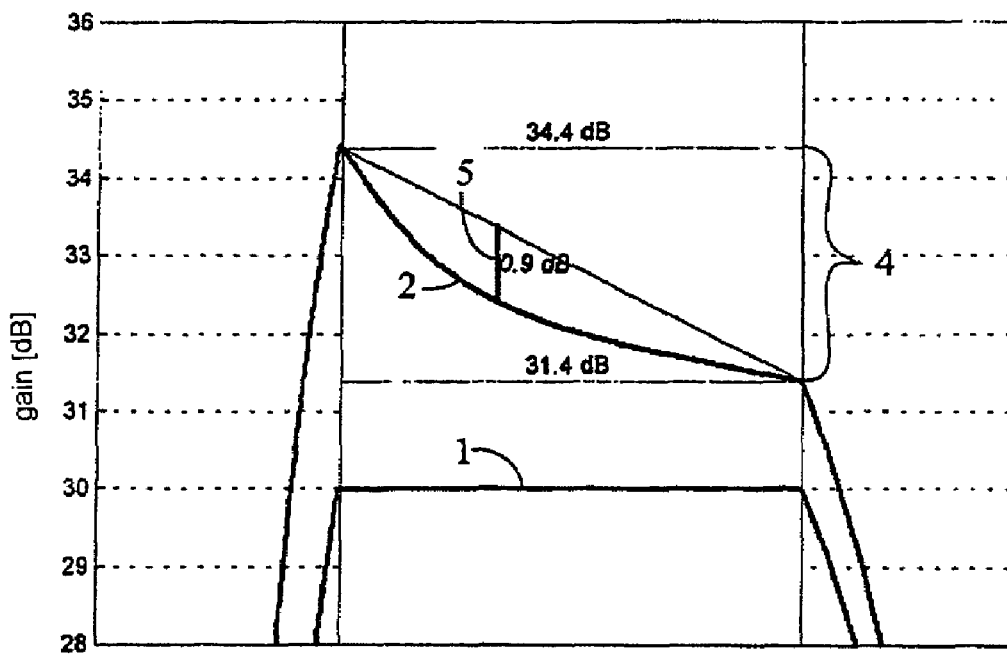
FIG. 1a shows a two-stage amplifier with reduction of the SRS influence by tilting of the gain.
Figure 1B:
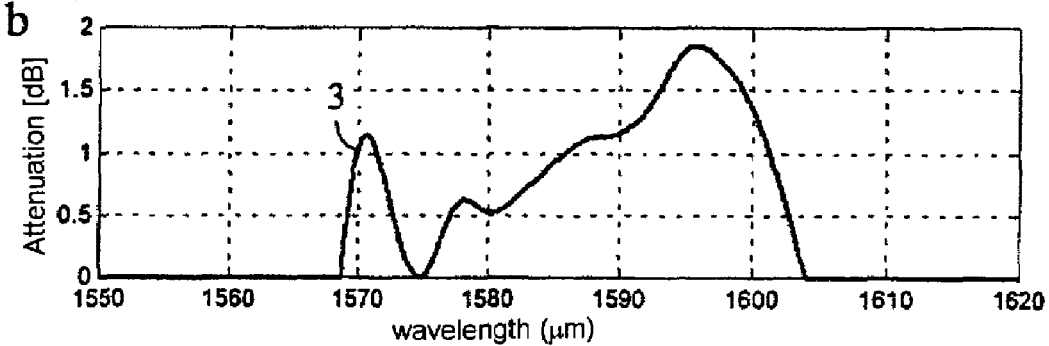
FIG. 1b shows a transmission characteristic of a filter used.

FIG. 1a shows how the SRS influence can be reduced by tilting the gain of an EDFA, the transmission characteristic of the filter used being illustrated in FIG. 1b therebelow.

Since optical data transmission paths can be of very different design, and the spectral power distribution can change during operation, only a variable, or settable, "gain tilting" makes sense. It is assumed in the following considerations that the mean population inversion of an EDFA in the initial state is selected such that minimal differences in gain, without the use of a filter, occur that are further largely completely eliminated with the aid of a filter.

Figure 3:
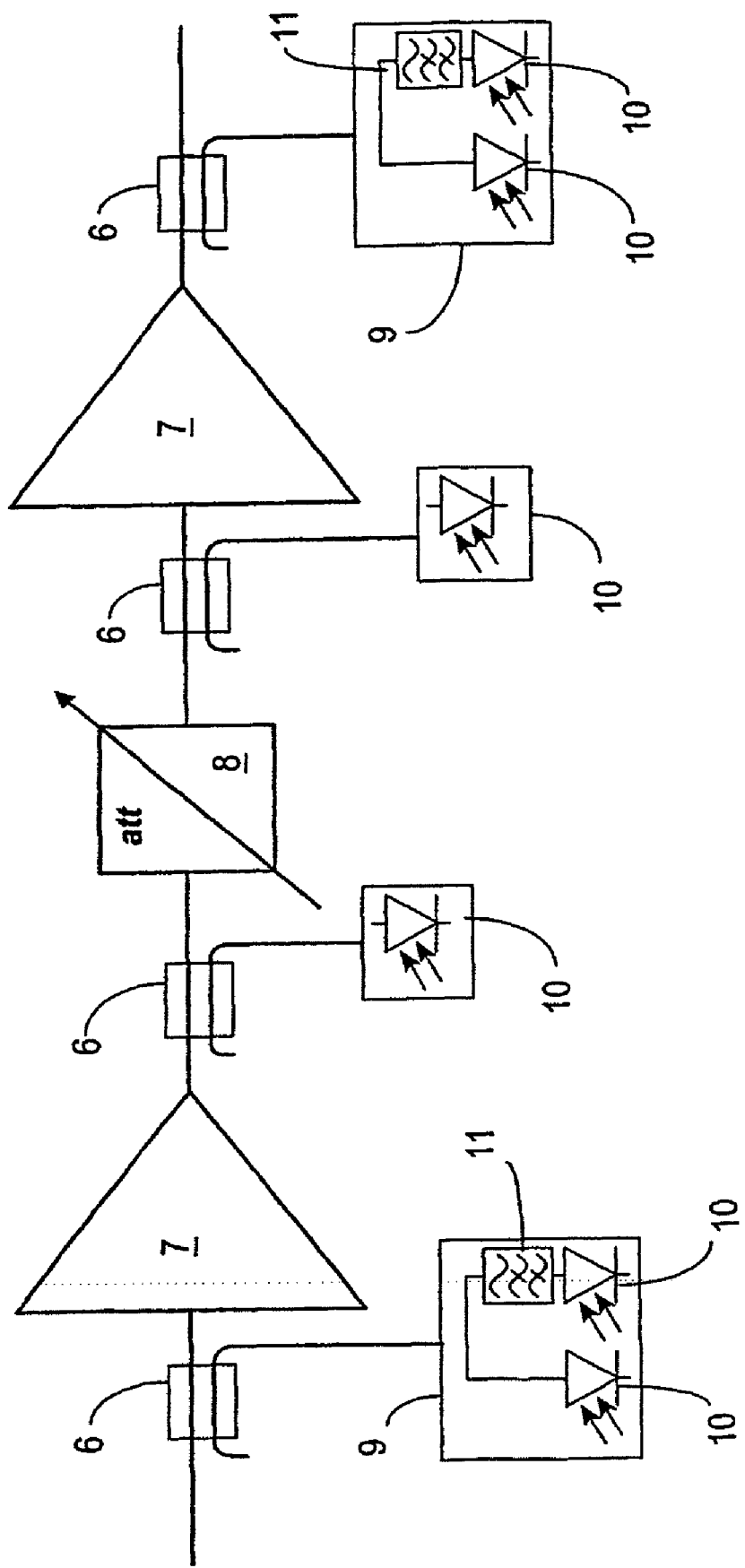
FIG. 3 shows a data transmission path with controllable gain tilting in order to compensate for the SRS.
Figure 4:
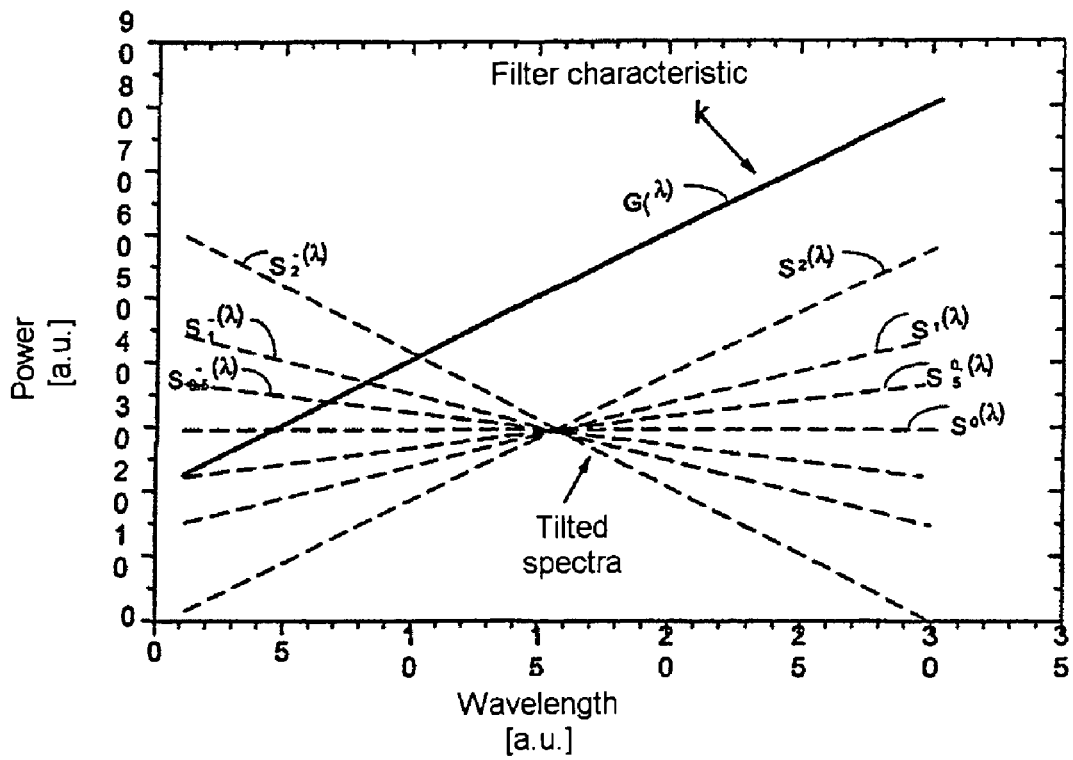
FIG. 4 shows an example of linearly tilted spectra and a linear frequency response of a filter.

In order to counteract the effect of the SRS, channels must experience a greater amplification for shorter wavelengths than for longer wavelengths. Precisely this effect occurs when the mean population inversion of the EDFA is increased, which is illustrated in FIGS. 1a and 1b. The gain profile is completely flat in the initial state. In order to achieve this, a filter with the transmission characteristic 3 shown in FIG. 1b was adopted. If the pump power in one or both amplifier stages 7 is now increased in the case of an EDFA design as shown in FIG. 3, the mean population inversion increases and the desired gain tilting occurs. Such a possible gain tilting as a function of the set power is also illustrated in the spectra of FIG. 4.

As FIGS. 1a and 1b show, however, this compensation method causes two difficulties. If the power of the equidistant channels is plotted logarithmically against their wavelength, the straight line 1 is yielded to a very good approximation when only the SRS is acting. The profile of the gain 2 of an EDFA does not, however, exhibit a linear profile as a function of the wavelength, and so no complete compensation is possible. In the example shown for an EDFA with 30 dB gain in the initial state, the pump power was set so as to result in a difference in gain 4 of at most 3 dB. Because of the nonideal shape of the curve, power differences 5 of 0.9 dB occur after the action of the SRS between the channels. This deviation from the ideal shape of the curve can, however, be compensated for by inserting appropriate filters into the path at a few points. In some circumstances, even the setting of different transmit powers already suffices to obtain equal power levels and/or signal-to-noise power ratios at all the receivers. A further disadvantage of the method is that the mean gain likewise increases. This can be compensated for by increasing the attenuation of the inserted attenuator. The error turns out to be substantially smaller when the channels are displaced to higher wavelengths by approximately 10 nm. The starting point in the example was a wavelength range of 1570 nm to 1605 nm, the so-called L band. However, the method also can be applied for other wavelength ranges.

Figure 2A:
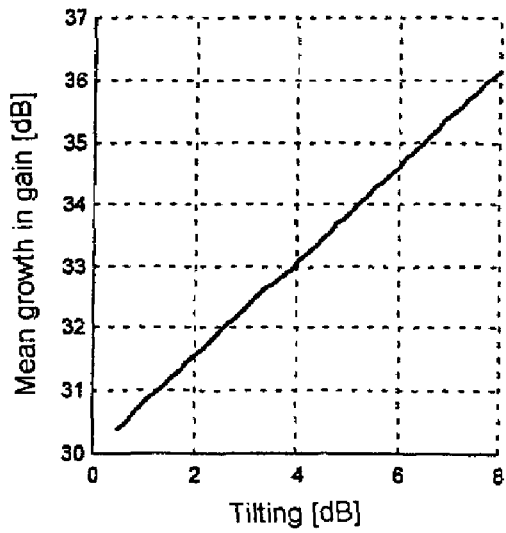
FIG. 2a shows an increase of the mean gain as a function of the tilting.
Figure 2B:
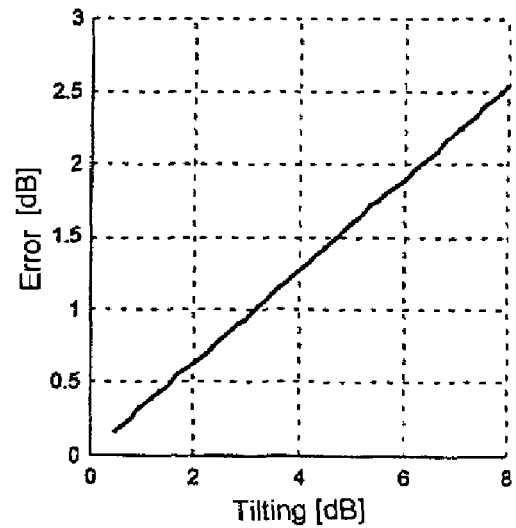
FIG. 2b shows errors as a function of the tilting.

The increase in the mean gain is illustrated in FIG. 2a, and the "error" occurring is illustrated in FIG. 2b as a function of the tilting. It may be seen that the power differences occurring owing to the SRS can be compensated for to approximately ⅔. In the initial state, the gain in decibels is $$G_{opt} = \frac{10}{\ln 10} L \cdot \{[\sigma^e(\lambda) + \sigma^a(\lambda)] \cdot \overline{N}_{opt} - \sigma^a(\lambda)\},$$

L standing for the total length of the doped fiber, $\sigma^e(\lambda)$ and $\sigma^a(\lambda)$ representing the coefficients, dependent on the wavelength $\lambda$, for emission and absorption, respectively, and $\overline{N}_{opt}$ representing the mean population inversion in the initial state.

It is assumed below that the differences in gain are completely compensated for in the initial state with the aid of a filter. If the mean population inversion is now increased by the value $\Delta \overline{N}$, the result for the gain is $$G_{comp} = \frac{10}{\ln 10} L \cdot \{[\sigma^e(\lambda) + \sigma^a(\lambda)] \cdot \overline{N}_{opt} + [\sigma^e(\lambda) + \sigma^a(\lambda)] \cdot \Delta \overline{N} - \sigma^a(\lambda)\}.$$

By comparison with the initial state, an increase in gain by $$\Delta G_{comp} = \frac{10}{\ln 10} L \cdot [\sigma^e(\lambda) + \sigma^a(\lambda)] \cdot \Delta \overline{N}$$

is thus to be recorded. The gain tilting effected by an increase in the mean population inversion can, therefore, be described by a function $f(\lambda)$ that is fixed by the active cross section and is still to be multiplied by a factor. The last equation above makes it plain that the compensation of the SRS cannot be improved when the starting point is another initial state of the EDFA.

In order to be able to use this method in a commercial transmission system, it is necessary to have available a suitable rule that can be implemented easily.

As already set forth, a unique relationship exists between the increase in the internal gain and the tilting. The internal gain can be determined from the gain measured between input and output, by further adding the attenuation of an inserted attenuator. A controlled variable for the tilting is indirectly obtained thereby.

A grave difficulty results, nevertheless. Since no measuring device is generally available for spectrally resolved measurement, only the total power is known at the input and output of the amplifier, but not how this is distributed over the individual channels. It is thus impossible to determine a mean gain as unique reference variable. A simple solution to this problem comes from the extended EDFA design shown in FIG. 3. Here, it is not only the total power that is measured at the input and at the output of the amplifier, but also the power at a specific wavelength. It is, therefore, possible to determine uniquely the gain for this wavelength channel, and thus also the tilting.

In order to reduce the influence of nonlinear fiber effects, various methods can be applied for occupying the available wavelength range depending on the type of fiber used. The above-described design of the present invention leads to restrictions, since the wavelength channel used to measure the gain must always be in operation.

A possible solution that circumvents this restriction can be set forth, as illustrated in FIG. 3.

FIG. 3 shows a two-stage amplifier including a data transmission path with controllable gain tilting intended for compensating for the tilting caused by stimulated Raman scattering (SRS), with two controllable amplifier stages (EDFA) 7. For the purpose of clarity, the associated electronic arrangement is not illustrated. Upstream of the first amplifier stage 7, a component signal is extracted via the first coupler 6, and a first photodiode 10 is used to measure the unfiltered total intensity and, after filtering by the known frequency-dependent filter 11, to measure the filtered total intensity. In accordance with the following description, these data are used to determine the input tilting of the signal into the first amplifier stage 7. Located downstream of the first amplifier stage 7 is a further coupler 6 and a photodiode 10 for controlling the gain of the first amplifier stage 7 in cooperation with the total intensity measured at the input. Subsequently, the signal passes a settable frequency-independent attenuator 8, a further coupler 6 which, in turn, extracts a component signal at the input of the second amplifier stage 7 and feeds it unfiltered to a photodiode 10 for measurement. Downstream of the second and last amplifier stage 7, once again, the resulting signal is partially extracted and fed for measurement to a measuring arrangement 9 with a photodiode 10 without prefilter and a photodiode 10 with an upstream filter 11. The tilting of the signal exiting the amplifier arrangement is determined in the way according to the present invention by the last measuring arrangement, and the tilting is correspondingly kept within the desired bounds or completely compensated for by varying the inversion of the EDFA, that is to say by controlling the gain of the amplifier stages 7. The settable attenuator 8 serves a purpose in this case of reducing the gain of the total amplifier, if appropriate in a frequency-independent fashion, or of raising it by retracting a preset attenuation.

Thus, in this design it is not the task of the illustrated filter 11 to select an individual channel, but to simulate in its attenuation response the wavelength dependence of the gain tilting, that is to say the function $f(\lambda)$ except for a constant of proportionality. Its transmission characteristic is $$T(\lambda) = \exp\{-\alpha \cdot f(\lambda)\},$$

in which the constant $\alpha$ may be known. If the powers of the N channels are designated by $P_i$ and their wavelengths by $\lambda_i$, the powers measured at the input are $$P_{in} = \sum_{i=1}^{N} P_i$$

and, after filtering, $$P_{in}^{filt} = \sum_{i=1}^{N} P_i \cdot \exp\{-\alpha \cdot f(\lambda_i)\}.$$

It holds correspondingly for the powers measured at the output of the amplifier that $$P_{out} = G_{opt} \cdot \sum_{i=1}^{N} P_i \exp\{\chi \cdot f(\lambda_i)\}$$

and, after filtering, $$P_{out}^{filt} = G_{opt} \cdot \sum_{i=1}^{N} P_i \exp\{(\chi - \alpha) \cdot f(\lambda_i)\}.$$

The constant $\chi$ determines the degree of gain tilting and is to be determined below. The first step for this purpose is to expand the exponential function in a series and truncate it after the second-order term. This results in the system of equations $$\frac{P_{out}}{G_{opt}} - P_{in} = \chi \cdot \sum_{i=1}^{N} f(\lambda_i) \cdot P_i + \frac{\chi^2}{2} \cdot \sum_{i=1}^{N} f^2(\lambda_i) \cdot P_i^2$$

$$\frac{P_{out}^{filt}}{G_{opt}} - P_{in} = (\chi - \alpha) \cdot \sum_{i=1}^{N} f(\lambda_i) \cdot P_i + \frac{(\chi - \alpha)^2}{2} \cdot \sum_{i=1}^{N} f^2(\lambda_i) \cdot P_i^2$$

$$P_{in}^{filt} - P_{in} = -\alpha \cdot \sum_{i=1}^{N} f(\lambda_i) \cdot P_i + \frac{\alpha^2}{2} \cdot \sum_{i=1}^{N} f^2(\lambda_i) \cdot P_i^2$$

consisting of three equations in which the three unknowns $$\chi, \quad \sum_{i=1}^{N} f(\lambda i) \cdot P_i \quad \text{and} \quad \sum_{i=1}^{N} f^2(\lambda_i) \cdot P_i^2$$

are obtained. The gain $G_{opt}$ in the initial state is known from the design and dimensioning of the EDFA. It is, therefore, possible to determine the target variable $\chi$ uniquely:

$$\chi = \alpha \cdot \frac{P_{out} + P_{out}^{filt} - (P_{in} + P_{in}^{filt}) \cdot G_{opt}}{P_{out} - P_{out}^{filt} + (P_{in} - P_{in}^{filt}) \cdot G_{opt}}.$$

The series expansion was terminated after the second-order term in order to keep the outlay low. As such, the exponential function can be approximated only within a bounded value range. If this value range is to be enlarged, terms of higher order likewise can be taken into account, there being a need to use further photodiodes with different upstream filters.

The Taylor series expansion yields a very good approximation of the exponential function for very small arguments, while greater deviations occur in the case of greater values. Consequently, the suggestion is to adapt the factor ½ in front of the second term such that the maximum error occurring becomes minimal within the desired value range. If the factor ½ is replaced, for example, by 0.81, gain tiltings of up to 4.5 dB can be set in conjunction with a maximum error of 0.18 dB.

In accordance with a further reaching aspect of the present invention, which leads to a particularly simple and elegant device for determining the tilting of the frequency spectrum, the following may be represented still employing special application of the above-described principle:

When considering the tilting in the case of a measured spectrum $S(\lambda)$ in the wavelength region of $\lambda_{start}$ to $\lambda_{stop}$, it is possible to determine it by a numerical analysis, and to characterize a characteristic quantity for the tilting; for example, the first moment $M_1$ of the spectrum relative to the middle wavelength $\lambda_c$ of the spectrum ($\lambda_c = (\lambda_{start} + \lambda_{stop})/2$):

$$M_1 = \int_{-L/2}^{+L/2} xS(x + \lambda_c)dx \quad \text{with} \quad L = (\lambda_{Stop} - \lambda_{Start})$$

It is also possible to use other odd functions $f(x)$ (here, odd refers to $f(x) = -f(-x)$):

$$V = \int_{-L/2}^{+L/2} f(x)S(x - \lambda_c)dx$$

According to the present invention, instead of a complicated spectrally resolved measurement of the spectrum $S(\lambda)$ and a subsequent numerical determination, by spectral analysis, of the tilting, the spectrum is weighted with the frequency response $G(\lambda)$ with the aid of an optical filter, and the aggregate output power $P_v$ of the filter is measured with the aid of a simple photodiode. The weighting can be adapted in this case to the expected tilting:

$$P_V = \int_0^{+\infty} G(\lambda)S(\lambda)d\lambda$$

Since the frequency response $G(\lambda)$ and the spectrum $S(\lambda)$ are greater than 0, $P_v$ is also greater than 0 even in the case of an untilted spectrum. This offset is to be born in mind during use. Furthermore, the frequency response $G(\lambda)$ from: $\lambda_{start}$ to $\lambda_{stop}$ should be odd in relation to $G(\lambda_c)$ (here, odd refers to $G(\lambda_c+x)-G(\lambda_c)=-[G(\lambda_c-x)-G(\lambda_c)]$). Moreover, the monotonic edge of the filter frequency response should extend from $\lambda_{start}$ to $\lambda_{stop}$. Again, frequency responses of photodiodes or couplers can be taken into account in $G(\lambda)$, if they would otherwise lead to falsifications of the measurement result. A bandpass restriction to a wavelength region to be considered (for example, from $\lambda_{start}$ to $\lambda_{stop}$) likewise can be included in $G(\lambda)$.

Figure 5:
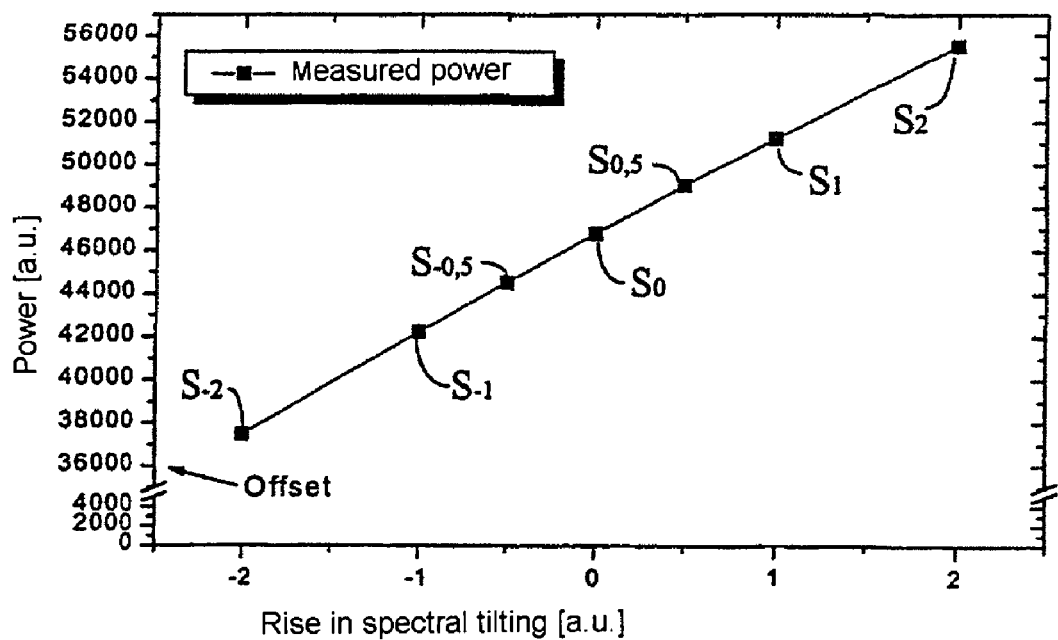
FIG. 5 shows measured powers downstream of the filter from FIG. 4, in relation to the rise in the tilting of the spectrum.

A number of linearly tilted spectra $S(\lambda)=a\cdot\lambda+b$, illustrated as dashed lines, are shown as a functional example in FIG. 4. The total power $$\int_0^{+\infty} S(\lambda)d\lambda$$

of all the spectra is the same here, and so the same power would be measured via a photodiode independently of the tilting. If a filter with frequency response $G(\lambda)$ is now inserted, the power measured at the photodiode becomes dependent on the tilting, as illustrated in FIG. 5, and it is thereby possible to use it as a measure of the tilting for control tasks.

For example, a Mach-Zehnder interferometer with a $\cos^2$-type frequency response can be used as suitable filter. In this case, the measured value has an offset dependent on the aggregate power of the optical signal. Offset refers to the measuring device supplying a signal even given a vanishing tilting of the spectrum. This disadvantage can be avoided via an optical filter with two opposing frequency responses $G_{AB}(\lambda)$ and $G_{AC}(\lambda)$ and if it holds that $G_{AB}(\lambda)+G_{AC}(\lambda)=$ const. An example of implementation with two opposing frequency responses is the use of the two outputs of a Mach-Zehnder interferometer. The tilting and the total power of the signal can be determined simultaneously with the aid of this design:

The tilting V is yielded from the difference between the measured values by:

$$V = P_{VC} - P_{VA} = \int_0^{+\infty} [G_{AC}(\lambda) - G_{AB}(\lambda)]S(\lambda)d\lambda$$

The offset of V vanishes in the case of $G_{AB}(\lambda_c)=G_{AC}(\lambda_c)$ for a linear frequency response.

The aggregate power P is calculated from the sum of the measured values:

$$P = P_{VC} + P_{VA} = \int_0^{+\infty} [G_{AC}(\lambda) + G_{AB}(\lambda)]S(\lambda)d\lambda = const. \int_0^{+\infty} S(\lambda)d\lambda$$

This variable is advantageously used as early as when controlling the pump laser diodes in fiber amplifiers, and now also can be used for normalizing the tilting if the magnitude of the tilting, and not only the sign, is required.

The very simple and therefore cost-effective design of this measurement proves to be particularly advantageous in this solution illustrated, there being no need for spectrally resolved measurement. A decentral control becomes possible, as a result of which the outlay on control software is reduced and the control rate is increased. Furthermore, the weighting can be adapted to a fundamentally known tilting function of the fiber amplifier, and to possible disturbances in the spectrum such as, for example, tilting owing to SRS attenuation.

Thus, as a whole, the present invention exhibits a simple method for determining the tilting of the spectrum of an optical signal by measuring at least one total intensity subsequent to a passage of the signal through an influencing characteristic, including the possibility of using it to set the spectral tilting.

It goes without saying that the abovenamed features of the present invention can be used not only in the combination respectively specified, but also in other combinations or on their own, without departing from the scope of the invention.

Indeed, although the present invention has been described with reference to specific embodiments, those of skill in the art will recognize that changes may be made thereto without departing from the spirit and scope of the present invention as set forth in the hereafter appended claims.

The invention claimed is:

1. A method for determining and setting a tilting of a spectrum of light signals in an optical fiber of an optical data transmission path having at least one part for varying the tilting of the spectrum, the method comprising the steps of:
   measuring a total intensity of the light signals before amplification;
   amplifying the light signals by at least one optical amplifier;
   extracting a portion of the amplified light signals;
   partially guiding the extracted light signals through an influencing element with a known frequency-dependent intensity influence, the influencing element being one of an amplifier, a waveguide structure having a positive amplifying action, and a fiber having a positive amplifying action;
   measuring a total intensity of the extracted light signals directly before and directly after the influencing element, wherein a point of measurement that occurs directly before the influencing element is not further amplified prior to the point where the extracted light signal reaches the influencing element; and
   determining a control criterion, based on the known frequency-dependent intensity influence of the influencing element and the measured total intensities, for setting the tilting via which the part for varying the tilting is controlled.

2. A method for determining and setting a tilting of a spectrum of light signals in an optical fiber of an optical data transmission path as claimed in claim 1, wherein the influencing element further may be one of a Mach-Zehnder interferometer, a dielectric filter, a fiber grating, and a wavelength-selective fusion coupler.

3. A method for determining and setting a tilting of a spectrum of light signals in an optical fiber of an optical data transmission path as claimed in claim 1, wherein the at least one optical amplifier is an Erbium Doped Fiber Amplifier.

4. A method for determining and setting a tilting of a spectrum of light signals in an optical fiber of an optical data transmission path as claimed in claim 1, wherein use is made of the at least one optical amplifier as the at least one part for varying the tilting.

5. A method for determining and setting a tilting of a spectrum of light signals in an optical fiber of an optical data transmission path as claimed in claim 4, wherein an existing tilting is one of compensated for completely, partially compensated for, and set to a tilting in an opposite direction.

6. A method for determining and setting a tilting of a spectrum of light signals in an optical fiber of an optical data transmission path as claimed in claim 4, wherein a tilting of a predefined magnitude is produced.

7. A method for determining and setting a tilting of a spectrum of light signals in an optical fiber of an optical data transmission path as claimed in claim 1, wherein the at least one part for varying the tilting is a settable frequency-dependent optical filter.

8. A method for determining and setting a tilting of a spectrum of light signals in an optical fiber of an optical data transmission path as claimed in claim 7, wherein the settable frequency-dependent optical filter is a Mach-Zehnder interferometer with one of adjustable power division into its two branches and settable time delay in at least one of its two branches.

* * * * *